United States Patent
Zhang et al.

(10) Patent No.: US 11,385,750 B2
(45) Date of Patent: Jul. 12, 2022

(54) TOUCH SUBSTRATE, METHOD OF MANUFACTURING THE SAME, AND TOUCH APPARATUS

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Guiyu Zhang, Beijing (CN); Lei Zhang, Beijing (CN); Zouming Xu, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 591 days.

(21) Appl. No.: 16/339,892

(22) PCT Filed: Oct. 17, 2018

(86) PCT No.: PCT/CN2018/110622
§ 371 (c)(1),
(2) Date: Apr. 5, 2019

(87) PCT Pub. No.: WO2019/080758
PCT Pub. Date: May 2, 2019

(65) Prior Publication Data
US 2021/0365151 A1 Nov. 25, 2021

(30) Foreign Application Priority Data
Oct. 23, 2017 (CN) .......................... 201710994052.9

(51) Int. Cl.
G06F 3/044 (2006.01)
G06F 3/041 (2006.01)

(52) U.S. Cl.
CPC ........ G06F 3/0446 (2019.05); G06F 3/04164 (2019.05); G06F 2203/04102 (2013.01); G06F 2203/04103 (2013.01)

(58) Field of Classification Search
CPC ............... G06F 3/0446; G06F 3/04164; G06F 2300/04102; G06F 2300/04103
(Continued)

(56) References Cited

U.S. PATENT DOCUMENTS

2015/0177878 A1* 6/2015 Cheng ....................... G06F 1/16
345/174
2016/0259447 A1* 9/2016 Lin ....................... G06F 3/0446
(Continued)

FOREIGN PATENT DOCUMENTS

| CN | 205068345 U | 3/2016 |
| CN | 105912164 A | 8/2016 |

(Continued)

OTHER PUBLICATIONS

International Search Report; Application No. PCT/CN2018/110622; dated Jan. 16, 2019; English Translation Attached.

*Primary Examiner* — Mark Edwards
(74) *Attorney, Agent, or Firm* — Nath, Goldberg & Meyer; Joshua B. Goldberg

(57) ABSTRACT

The present application provides a touch substrate, a method of manufacturing a touch substrate and a touch apparatus. The touch substrate includes a plurality of first touch electrodes and a plurality of second touch electrodes intersecting with each other. Each of at least part of the plurality of first touch electrodes includes a plurality of first electrodes disposed along a first direction and a first connection part (Continued)

connecting adjacent first electrodes. The first connection part includes at least one first connection line extending along the first direction and configured to connect the two first electrodes adjacent in the first direction. The first connection line has a curved line shape.

14 Claims, 8 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2017/0139525 A1* | 5/2017 | Jo | ............................ G06F 3/041 |
| 2017/0153726 A1* | 6/2017 | Lee | ........................ G06F 3/0446 |
| 2017/0255303 A1* | 9/2017 | Huang | .................. G06F 3/0446 |
| 2017/0277325 A1 | 9/2017 | Xie et al. | |
| 2017/0285801 A1* | 10/2017 | Choi | ..................... G06F 3/0443 |
| 2017/0371471 A1* | 12/2017 | Kim | ....................... G06F 3/0448 |
| 2019/0204975 A1 | 7/2019 | Xie et al. | |

FOREIGN PATENT DOCUMENTS

| | | |
|---|---|---|
| CN | 107066160 A | 8/2017 |
| CN | 107632740 A | 1/2018 |

* cited by examiner

-- Prior Art --

-- Prior Art --

TOUCH SUBSTRATE, METHOD OF MANUFACTURING THE SAME, AND TOUCH APPARATUS

CROSS-REFERENCE TO RELATED APPLICATION

This is a National Phase Application filed under 35 U.S.C. 371 as a national stage of PCT/CN2018/110622, filed on Oct. 17, 2018, an application claiming the benefit of Chinese Patent Application No. 201710994052.9, filed on Oct. 23, 2017, the entire contents of which are hereby incorporated by reference.

TECHNICAL FIELD

The present disclosure relates to the field of touch technology, and particularly, to a touch substrate, a method of manufacturing a touch substrate, and a touch apparatus.

BACKGROUND

Flexible electronic apparatuses have been developed in recent years. Flexible electronic apparatuses are apparatuses that can be bent or folded, and are typically fabricated by mounting an electronic device on a flexible base substrate.

SUMMARY

In an aspect, the present disclosure provides a touch substrate. The touch substrate includes a plurality of first touch electrodes and a plurality of second touch electrodes intersecting with each other; each of at least part of the plurality of first touch electrodes includes a plurality of first electrodes disposed along a first direction and a first connection part connecting adjacent first electrodes, the first connection part includes at least one first connection line extending along the first direction and configured to connect two first electrodes adjacent in the first direction, and the first connection line has a curved line shape.

In some embodiments, each of the at least part of the plurality of first electrodes includes two first sub-electrodes disposed along the first direction and a second connection part connecting the two first sub-electrodes, and the two first sub-electrodes are spaced apart from each other by a first gap extending along a second direction and between the two first sub-electrodes.

In some embodiments, the second connection part includes at least one second connection line extending along the first direction and configured to connect the two first sub-electrodes belonging to a same first electrode, and the second connection line has a curved line shape.

In some embodiments, the at least one second connection line and the at least one first connection line are disposed in a same layer.

In some embodiments, the first sub-electrode has a curved edge.

In some embodiments, each of at least part of the plurality of second touch electrodes includes a plurality of second electrodes disposed along a second direction and a third connection part connecting adjacent second electrodes, the third connection part is insulated from the first connection part and an orthographic projection of the third connection part on a plane parallel to the touch substrate partially overlaps an orthographic projection of the first connection part on the plane.

In some embodiments, each of at least part of the plurality of second electrodes includes two second sub-electrodes disposed along the second direction and a fourth connection part connecting the two second sub-electrodes, and the two second sub-electrodes are spaced apart from each other by a second gap extending along the first direction and between the two second sub-electrodes.

In some embodiments, the fourth connection part includes at least one third connection line extending along the second direction and configured to connect the two second sub-electrodes belonging to a same second electrode, and the third connection line has a curved line shape.

In some embodiments, the at least one third connection line and the at least one first connection line are disposed in a same layer.

In some embodiments, the second sub-electrode has a curved edge.

In some embodiments, the at least one first connection line and the first electrode are made of a same material.

In some embodiments, an included angle between any two adjacent segments of the first connection line having the curved line shape is larger than 90° and less than 180°.

In another aspect, the present disclosure further provides a touch apparatus, including any one of the touch substrates described herein.

In another aspect, the present disclosure further provides a method of manufacturing a touch substrate, including forming a first touch electrode on a base substrate, the first touch electrode being formed to include a plurality of first electrodes along a first direction and a first connection part connecting adjacent first electrodes, the first connection part being formed to include at least one first connection line extending along the first direction and configured to connect two first electrodes adjacent in the first direction, the first connection line having a curved line shape; forming a second touch electrode on the base substrate, the second touch electrode being formed to intersect with the first touch electrode.

In some embodiments, the second touch electrode is formed to include a plurality of second electrodes disposed along a second direction and a third connection part connecting adjacent second electrodes, the third connection part being insulated from the first connection part and an orthographic projection of the third connection part on the base substrate partially overlapping an orthographic projection of the first connection part on the base substrate; the first touch electrode and the second touch electrode are formed simultaneously, and forming the first touch electrode and the second touch electrode includes: forming a pattern of the first electrode, a pattern of the second electrode and a pattern of the third connection part on the base substrate; forming a pattern of an insulation layer on a side of the pattern of the third connection part away from the base substrate; and forming a pattern of the at least one first connection line on a side of the insulation layer away from the base substrate.

In some embodiments, the first electrode is formed to include two first sub-electrodes disposed along the first direction and a second connection part connecting the two first sub-electrodes, and a first gap extending along a second direction is formed between the two first sub-electrodes; the second electrode is formed to include two second sub-electrodes disposed along the second direction and a fourth connection part connecting the two second sub-electrodes, and a second gap extending along the first direction is formed between the two second sub-electrodes; forming the pattern of the first electrode, the pattern of the second electrode and the pattern of the third connection part on the base substrate includes forming a pattern of the first sub-electrode, a pattern of the second sub-electrode and the pattern of the third connection part by a single patterning process; forming a pattern of the second connection part and a pattern of the fourth connection part by a single patterning process, wherein the single patterning process for forming the pattern of the second connection part and the pattern of the fourth connection part and a patterning process for forming the pattern of the at least one first connection line are a same patterning process.

DETAILED DESCRIPTION

In order to enable a person skilled in the art to better understand the technical solutions of the present disclosure, a touch substrate, a method of manufacturing the same and a touch apparatus provided by the present disclosure are described in detail below with reference to the accompanying drawings. The figures are not necessarily to scale, and elements of like structures or functions are denoted by like references throughout the drawings for purpose of illustrations. The drawings are only intended to facilitate the description of the various embodiments described herein. The drawings do not describe each aspect of the teachings disclosed herein and do not limit the scope of the claims.

Figure 1:
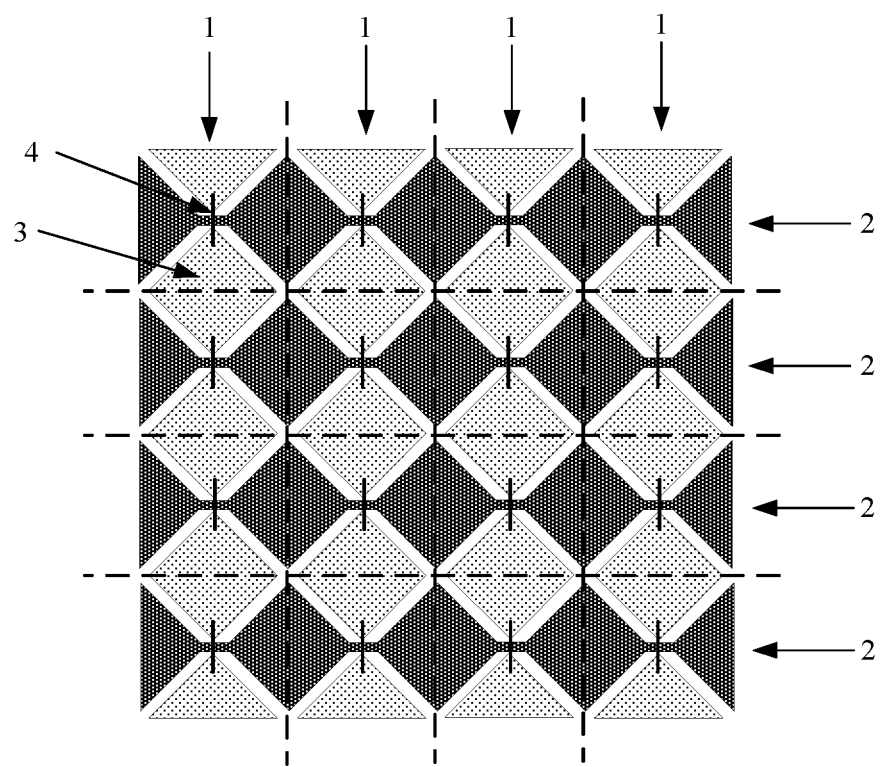
FIG. 1 is a schematic diagram illustrating a structure of an existing touch substrate.
Figure 2:
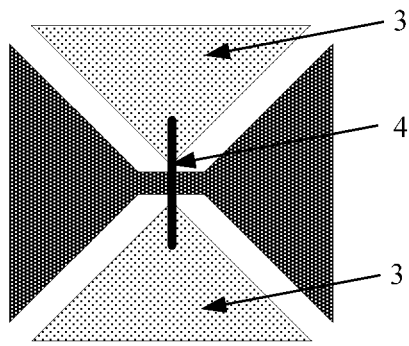
FIG. 2 is a plan view of a touch unit of FIG. 1.

FIG. 1 is a schematic diagram illustrating a structure of an existing touch substrate; and FIG. 2 is a plan view of a touch unit of FIG. 1. As illustrated in FIGS. 1 and 2, the touch substrate includes a plurality of first touch electrodes 1 and a plurality of second touch electrodes 2 intersecting with each other. Each of the plurality of first touch electrodes 1 includes a plurality of first electrodes 3 disposed in a vertical direction and a metal bridge line 4 connecting adjacent first electrodes 3. The metal bridge line 4 has a linear shape and extends along the vertical direction. The metal bridge line 4 having the linear shape has both ends connected to respective first electrodes 3. The first touch electrode 1 is insulated from the second touch electrode 2.

When the touch substrate is bent in the vertical direction, the first touch electrode extending along the vertical direction is bent, and stress is concentrated at the metal bridge line and the metal bridge line is subjected to plastic deformation. When the external force is removed, internal stress exists at the metal bridge line due to the plastic deformation occurring at the metal bridge line, and the internal stress may adversely affect the structure, stability and rigidity of the metal bridge line, easily leading to breakage of the metal bridge line, and causing touch defects.

Accordingly, the present disclosure provides, inter alia, a touch substrate, a method of manufacturing a touch substrate, and a touch apparatus that substantially obviate one or more of the problems due to limitations and disadvantages of the related art.

Figure 3:
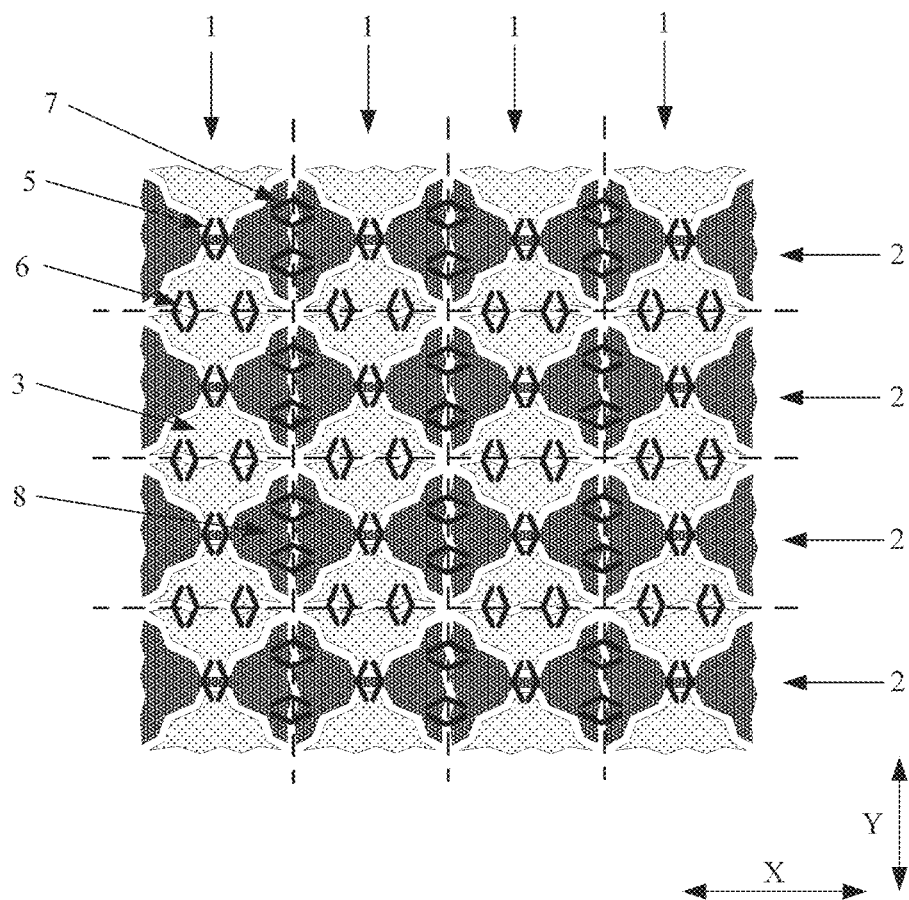
FIG. 3 is a schematic diagram illustrating a structure of a touch substrate in an embodiment according to the present disclosure.
Figure 4:
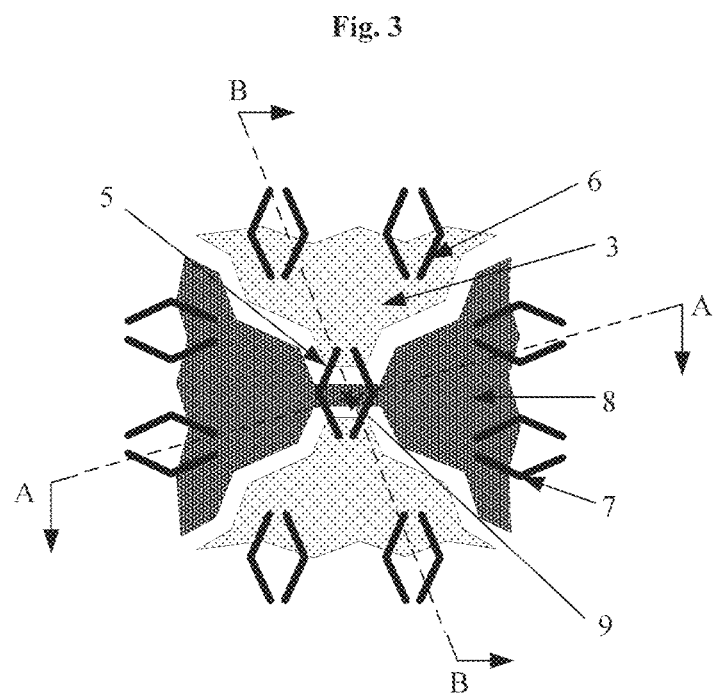
FIG. 4 is a plan view of a touch unit of FIG. 3.
Figure 5:
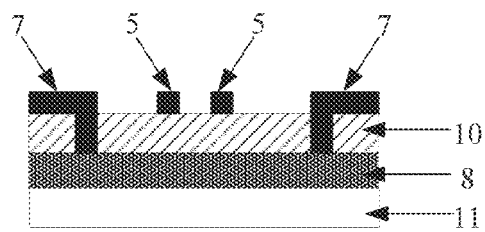
FIG. 5 is a cross-sectional view taken along line A-A in FIG. 4.
Figure 6:
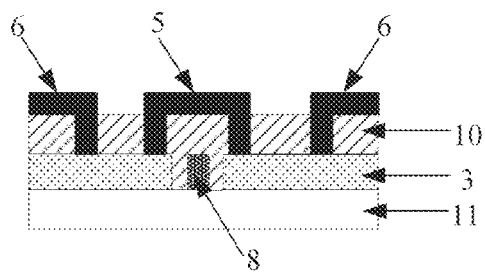
FIG. 6 is a cross-sectional view taken along line B-B in FIG. 4.
Figure 7A:
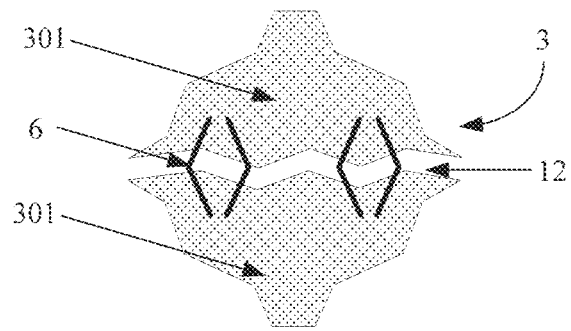
FIG. 7A is a plan view of one first electrode in an embodiment according to the present disclosure.
Figure 7B:
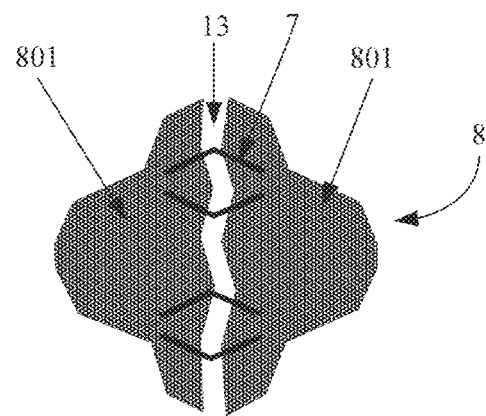
FIG. 7B is a plan view of one second electrode in an embodiment according to the present disclosure.
Figure 7C:
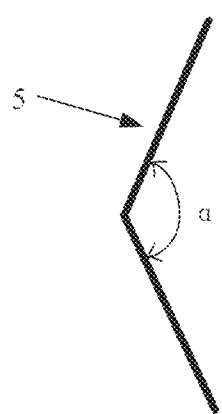
FIG. 7C is a plan view of one first connection line in an embodiment according to the present disclosure.

In an aspect, the present disclosure provides a touch substrate. FIG. 3 is a schematic diagram illustrating a structure of a touch substrate in an embodiment according to the present disclosure; FIG. 4 is a plan view of one touch unit in FIG. 3; FIG. 5 is a cross-sectional view taken along line A-A in FIG. 4; FIG. 6 is a cross-sectional view taken along line B-B in FIG. 4; FIG. 7A is a plan view of one first electrode in an embodiment according to the present disclosure; FIG. 7B is a plan view of one second electrode in an embodiment according to the present disclosure; and FIG. 7C is a plan view of one first connection line in an embodiment according to the present disclosure. Referring to FIGS. 3 to 7C, the touch substrate in an embodiment includes a plurality of first touch electrodes 1 and a plurality of second touch electrodes 2, each of at least part of the plurality of first touch electrodes 1 extends along a first direction Y, each of at least part of the plurality of second touch electrode 2 extends along a second direction X, and the plurality of first touch electrodes 1 and the plurality of second touch electrodes 2 intersect with each other. In embodiments of the present disclosure, exemplary descriptions are given by taking the first direction Y as a vertical direction in the drawings and the second direction X as a horizontal direction in the drawings as an example, but the first direction Y and the second direction X are not limited to those shown in the drawings.

It should be noted that the base substrate 11 has to be a flexible base substrate such that the touch substrate is bendable. In the present disclosure, one of the first electrode 1 and the second electrode 2 is a touch driving electrode and the other is a touch sensing electrode. The specific process of realizing touch control by using the touch driving electrode and the touch sensing electrode will not be described in detail herein.

In an embodiment, each of the at least part of the plurality of first touch electrodes 1 includes a plurality of first electrodes 3 disposed along the first direction Y and a first connection part connecting adjacent first electrodes 3, the first connection part includes at least one first connection line 5 extending along the first direction Y and configured to connect two first electrodes 3 adjacent in the first direction Y. and the first connection line 5 has a curved line shape.

It should be noted that the first connection line 5 having a curved line shape consisting of two line segments is illustrated in FIGS. 3 and 4 by way of example only. The first connection line in the present disclosure may have a curved line shape consisting of a plurality of line segments connected end to end. Moreover, in the present disclosure, the connection line having a curved line shape extending along a direction (e.g., first direction/second direction) refers to that each line segment of the connection line has a same angle with respect to the extending direction.

For improving the lapping effect between the first connection line 5 and the first electrode 3, in some embodiments, the first connection line 5 and the first electrode 3 are made of a same material. In an embodiment, the first connection line 5 and the first electrode 3 are both made of indium tin oxide (ITO). Since the first connection line 5 and the first electrode 3 are made of a same material (i.e., film-forming conditions thereof are the same), the first connection line 5 in an upper/lower layer can be effectively lapped on the first electrode 3 in a lower/upper layer.

Next, the principle of avoiding the breakage of the first connection line 5 in the present disclosure will be described in detail with reference to the drawings. Assuming that the touch substrate is bent in the first direction Y, a deformation may occur at the first connection line 5 because the first connection line 5 has a narrower width and stress is mainly concentrated on the first connection line. The deformation at the first connection line 5 may be stretched deformation or compressed deformation. Next, an exemplary description will be given by taking an example in which the stretched deformation occurs at the first connection line 5.

Figure 8:
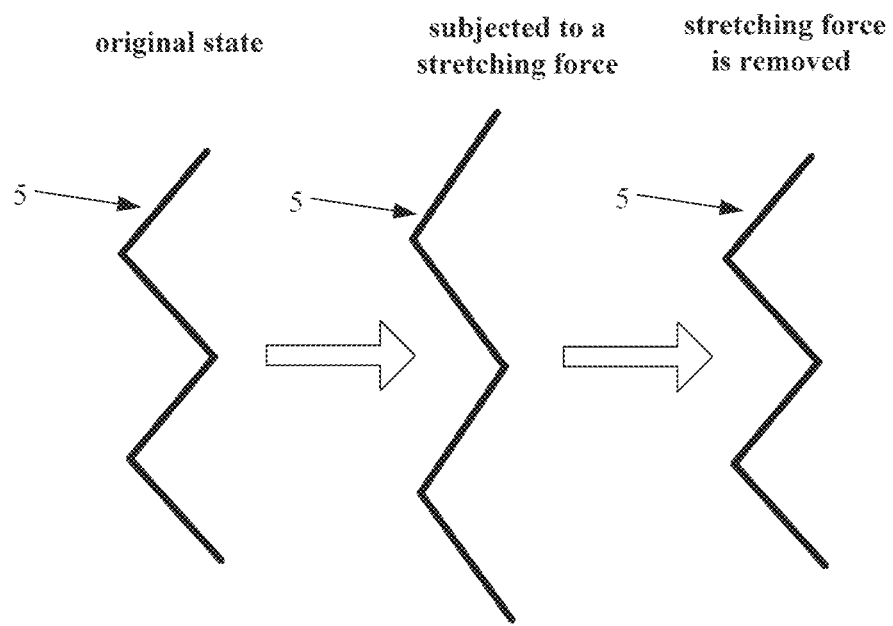
FIG. 8 is a schematic diagram illustrating a first connection line in a state where a stretching force is applied thereto and in a state where the stretching force is removed therefrom in an embodiment according to the present disclosure.

FIG. 8 is a schematic diagram illustrating a first connection line in a state where a stretching force is applied thereto and in a state where the stretching force is removed therefrom in an embodiment according to the present disclosure. As illustrated in FIG. 8, in the present disclosure, the first connection line 5 can be considered as a spring element by designing the first connection line 5 extending along the first direction Y to have a curved line shape, so that the elastic limit of the first connection line 5 can be improved effectively. Here, the term "elastic limit" refers to such a limit that when an interaction force within an object against an external force when the object is subjected to the external force does not exceed the limit, the deformation of the object is released completely and the object recovers to its original state once the external force is removed.

When the first connection line 5 is subjected to an external force (stretching force), the first connection line 5 undergoes an elastic deformation instead of a plastic deformation due to a larger elastic limit of the first connection line 5. When the external force is removed, the first connection line 5 can return to original under the action of elastic force and there is no internal stress in the first connection line 5, because the deformation of the first connection line 5 is the elastic deformation. In this case, the structure, stability and rigidity of the first connection line 5 can maintain as original, thereby avoiding the breakage of the first connection line 5 effectively.

It should be noted that when the first connection line 5 is subjected to a compressing force, the first connection line 5 also undergoes an elastic deformation instead of a plastic deformation, the principle of which is the same as that described above, which will not be repeated here.

It can be seen that in the present disclosure, when the touch substrate is bent in the first direction Y such that a stretched deformation or compressed deformation occurs at the first connection line 5, the first connection line 5 may undergoes an elastic deformation instead of a plastic deformation, thereby avoiding the breakage of the first connection line 5 effectively and improving the bendability of the touch substrate.

For the first connection line 5 having the curved line shape, the smaller the included angle between two adjacent line segments thereof, the larger the density of the line segments, and the poor the blanking effect of the first connection line 5, which affects the visual experience of the user. For this reason, as illustrated in FIG. 7C, in some embodiments, an included angle α between any two adjacent line segments of the first connection line 5 having the curved line shape is larger than 900 and less than 180°.

In the present disclosure, one first connection part may include one, two or more first connection lines 5 (one first connection part including two first connection lines 5 is illustrated in figures by way of example). In some embodiments, one first connection part includes two or more first connection lines 5. As such, in a case where one of the first connection lines 5 is broken, the other can maintain the electrical connection between respective two first electrodes 3, thereby improving the disaster tolerance of the touch substrate.

As illustrated in FIG. 3 and FIG. 7A, in some embodiments, each of the at least part of the plurality of first touch electrodes 3 includes two first sub-electrodes 301 disposed along the first direction Y and a second connection part connecting the two first sub-electrodes 301, and the two first sub-electrodes 301 are spaced apart from each other by a first gap 12 extending along the second direction X and between the two first sub-electrodes 301. That is, the first gap is defined by opposite edges of the two first sub-electrodes 301, as illustrated in FIG. 7A. In the present disclosure, a gap extending along the second (first) direction indicates that each line segment of edges of two first (second) sub-electrodes defining the gap has a same angle with respect to the extending direction. In this case, when the touch substrate is bent in the first direction Y, the stress not only concentrates at the first connection line 5, but also concentrates at the second connection part, such that deformations occur at the first connection line 5 as well as the second connection part. It can be seen that the technical solution of the present disclosure can increase an area of a bendable region (regions corresponding to the first connection line 5 and the second connection part) in the first touch electrode 1, such that the flexibility of bending the touch substrate is improved. In addition, the stress at the first connection line 5 decreases as the area of the regions where the stress concentrates increases, and the breakage of the first connection line 5 can be effectively avoided.

In some embodiments, the second connection part includes at least one second connection line 6 (one second connection part including four second connection lines 6 is illustrated in figures by way of example) extending along the first direction Y and configured to connect the two first sub-electrodes 301 belonging to a same first electrode 3, and the second connection line 6 has a curved line shape. In the present disclosure, an elastic limit of the second connection line 6 can be effectively improved by designing the second connection line 6 to have a curved shape, thereby avoiding the breakage of the second connection line 6, the principle of which may refer to the above description made to the first connection line 5 and will not be repeated here.

In some embodiments, the second connection line 6 and the first connection line 5 may be disposed in a same layer. In this case, the first connection line 5 and the second connection line 6 may be fabricated at the same time by using the existing fabrication process for the first connection line 5, without changing the fabrication process.

In the present application, "disposed in a same layer" refers to dispose through a same patterning process using a same mask.

In some embodiments, one second connection part includes two or more second connection lines 6. As such, in a case where one of the second connection lines 6 is broken, the other can maintain the electrical connection between respective two first sub-electrodes 301, thereby improving the disaster tolerance of the touch substrate.

Figure 9:
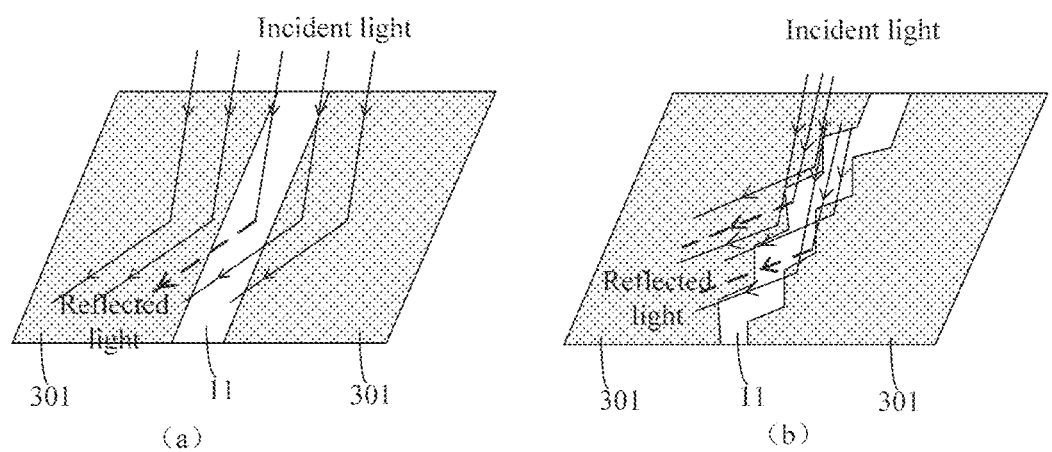
FIG. 9 is a diagram illustrating comparison between a light path of reflections occurring at a linear edge and a light path of reflections occurring at a curved edge.

In some embodiments, the first sub-electrode 301 has a curved edge. FIG. 9 is a diagram illustrating comparison between a light path of reflections occurring at a linear edge and a light path of reflections occurring at a curved edge. As illustrated in FIG. 9, since the base substrate 11 and the first sub-electrode 301 have different reflectivities, an intensity of light reflected from a region of the base substrate 11 covered by the first sub-electrode 301 is different from an intensity of light reflected from a region of the base substrate 11 not covered by the first sub-electrode 301. In the design scheme (a) with a linear edge, since the reflected light is light beams that do not interfere with one another, an obvious light-dark boundary may be viewed by human eyes at the edge of the first sub-electrode 301; however, in the design scheme (b) with a curved edge, since the reflected light interferes with one another, a brightness superposition effect occurs at a majority of regions at the edge of the first sub-electrode 301, such that no obvious light-dark boundary can be viewed by human eyes at the edge of the first sub-electrode 301. It can be seen that in the present disclosure, the blanking effect of the first sub-electrode 301 can be effectively improved by designing the first sub-electrode 301 to have a curved edge (e.g., an edge having a curved line shape).

Referring to FIG. 3 to FIG. 7C again, each of the at least part of the plurality of second touch electrodes 2 includes a plurality of second electrodes 8 disposed along the second direction X and a third connection part 9 connecting adjacent second electrodes 8, the third connection part 9 is insulated from the first connection part, and an orthographic projection of the third connection part 9 on the base substrate 11 partially overlaps an orthographic projection of the first connection part on the base substrate 11. In some embodiments, an orthographic projection of the third connection part 9 on a plane parallel to the touch substrate partially overlaps an orthographic projection of the first connection part on the plane. The orthographic projections overlap such that the first connection part can be designed shorter and narrower, the resistance thereof can be smaller, and the blanking effect thereof can be improved to improve visual experience of the user. In some embodiments, the third connection part 9 is disposed in the same layer as the first electrode 3 and the second electrode 8, an insulation layer 10 is disposed on the third connection part 10, and the first connection part is disposed on the insulation layer 10.

In order that the touch substrate is bendable in the second direction X, the structure of the second electrode 8 is designed accordingly. As illustrated in FIG. 3 and FIG. 7B, in some embodiments, each of the at least part of the plurality of second touch electrodes 8 includes two second sub-electrodes 801 disposed along the second direction X and a fourth connection part connecting the two second sub-electrodes 801, and the two second sub-electrodes 801 are spaced apart from each other by a second gap 13 extending along the first direction Y and between the two second sub-electrodes 801. That is, the second gap 13 is defined by opposite edges of the two second sub-electrodes 801, as illustrated in FIG. 7B. The second gap extending along the first direction Y allows the touch substrate to be bent in the second direction X.

When the touch substrate is bent in the second direction X, a deformation occurs at the fourth connection part. In order to avoid the breakage of the fourth connection part, in some embodiments, the fourth connection part includes at least one third connection line 7 extending along the second direction X and configured to connect the two second sub-electrodes 801 belonging to a same second electrode 8, and the third connection line 7 has a curved line shape. In the present disclosure, an elastic limit of the third connection line 7 can be effectively improved by designing the third connection line 7 to have a curved line shape, thereby avoiding the breakage of the third connection line 7, the principle of which may refer to the above description made to the first connection line 5 and will not be repeated here.

In some embodiments, the third connection line 7 and the first connection line 5 are disposed in a same layer. In this case, the first connection line 5 and the third connection line 7 may be fabricated at the same time by using the existing fabrication process for the first connection line 5 without changing the fabrication process.

In some embodiments, the fourth connection part includes two or more third connection lines 7. As such, in a case where one of the third connection lines 7 is broken, the other can maintain the electrical connection between respective two second sub-electrodes 801.

Further, an edge of the second sub-electrode 8 may be designed to have a curved shape to improve the blanking effect of the second electrode 8, the principle of which may refer to the description made to FIG. 9 and will not be repeated here.

Next, the touch performance of the touch substrate as shown in FIG. 3 of the present disclosure is compared with the touch performance of the existing touch substrate as shown in FIG. 1, as indicated in table 1 below.

TABLE 1

Comparison of touch performances of touch substrates

| | Touch substrate of FIG. 1 | Touch substrate of FIG. 3 |
|---|---|---|
| Size of touch unit (mm) | 4.037 × 4.052 | 4.037 × 4.052 |
| Resistance of first touch electrode 1 (ohms) | 403 | 332 |
| Resistance of second touch electrode 2 (ohms) | 380 | 311 |
| Mutual capacitance of the first and second touch electrodes 1 and 2 in the absence of a touch (pF) | 0.7363 | 0.6319 |
| Mutual capacitance of the first and second touch electrodes 1 and 2 in the presence of a touch (pF) | 0.6174 | 0.5174 |
| Change of mutual capacitance in percentage caused by a touch | 16.15% | 18.12% |

From above table it can be seen that, compared to the existing touch substrate, the technical solution of the present disclosure can effectively reduce the resistances of the first touch electrode 1 and the second touch electrode 2, thereby attenuation degree of signals in the first touch electrode 1 and the second touch electrode 2 can be effectively reduced to ensure the accuracy of signal transmission. Moreover, the technical solution of the present disclosure can effectively increase change of the mutual capacitance in percentage caused by a touch, i.e., the degree of the change in the mutual capacitance is relative larger, facilitating recognition of the touch event by the chip. It can be seen that the technical solution of the present disclosure can improve the accuracy of touch recognition.

Embodiments of the present disclosure provide a touch substrate. The touch substrate includes a plurality of first touch electrodes and a plurality of second touch electrodes intersecting with each other; each of at least part of the plurality of first touch electrodes includes a plurality of first electrodes disposed along a first direction and a first connection part connecting adjacent first electrodes, the first connection part includes at least one first connection line extending along the first direction and configured to connect two first electrodes adjacent in the first direction, and the first connection line has a curved line shape. The technical solution of the present disclosure can effectively avoid the breakage of the first connection line when the touch substrate is bent in the first direction. Moreover, the touch substrate is bendable in the second direction in a case where the second electrode is designed to have two second sub-electrodes along the second direction, thereby improving flexibility of the touch substrate.

In another aspect, the present disclosure provides a touch apparatus. In some embodiments, the touch apparatus includes a touch substrate, the touch substrate being any one of the touch substrates described herein, description of which may refer to corresponding descriptions in the above embodiments and will not be repeated here.

Figure 10:
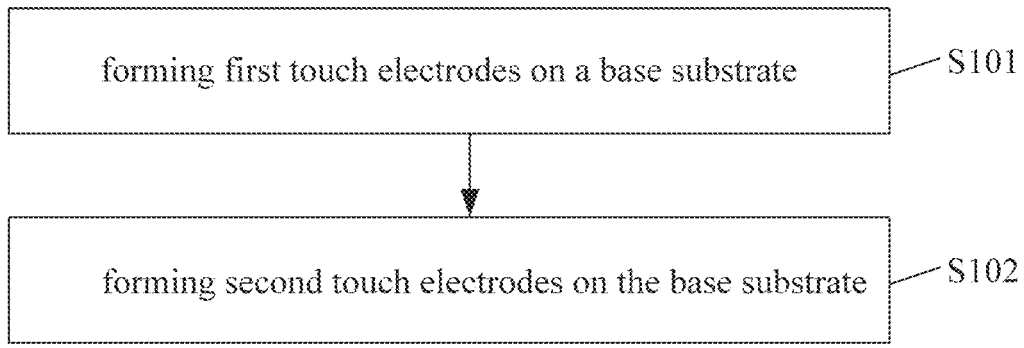
FIG. 10 is a flowchart illustrating a method of manufacturing a touch substrate in an embodiment according to the present disclosure.

In another aspect, the present disclosure provides a method of manufacturing a touch substrate. FIG. 10 is a flowchart illustrating a method of manufacturing a touch substrate in an embodiment according to the present disclosure. The manufacturing method is for manufacturing any one of the above described touch substrates. As illustrated in FIG. 10, the manufacturing method may include step S101 and step S102.

At step S101, a first touch electrode is formed on a base substrate, the first touch substrate is formed to include a plurality of first electrodes along a first direction and a first connection part connecting adjacent first electrodes, and the first connection part is formed to include at least one first connection line extending along the first direction and configured to connect two first electrodes adjacent in the first direction, the first connection line having a curved line shape.

To implement a bendable touch substrate, the base substrate in the present disclosure is a flexible substrate. In some embodiments, the flexible substrate may be made of Polyethylene Terephthalate (PET) or Cyclo Olepfin Polymer (COP).

At step S102, a second touch electrode is formed on the base substrate, the second touch electrode is formed to intersect with the first touch electrode.

In embodiments, the first connection line has a curved line shape, so the elastic limit of the first connection line can be effectively improved. When the first connection line is subjected to an external force, the first connection line undergoes an elastic deformation instead of a plastic deformation due to a larger elastic limit of the first connection line. When the external force is removed, the first connection line can return to original under the action of elastic force and there is no internal stress in the first connection line, because the deformation of the first connection line is the elastic deformation. In this case, the structure, stability and rigidity of the first connection line can maintain as original, thereby avoiding the breakage of the first connection line effectively.

Figure 11:
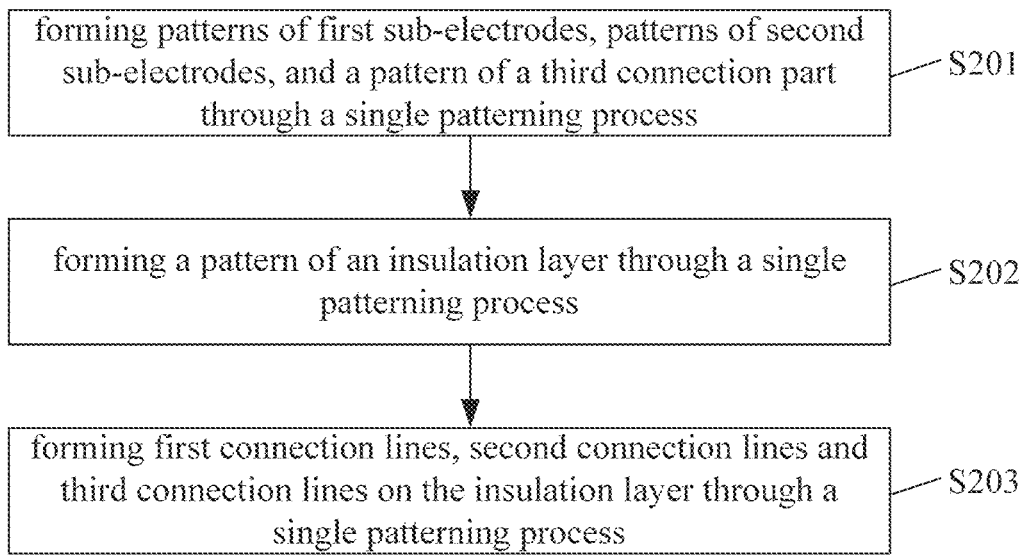
FIG. 11 is a flowchart illustrating a method of manufacturing a touch substrate in an embodiment according to the present disclosure.
Figure 12A:
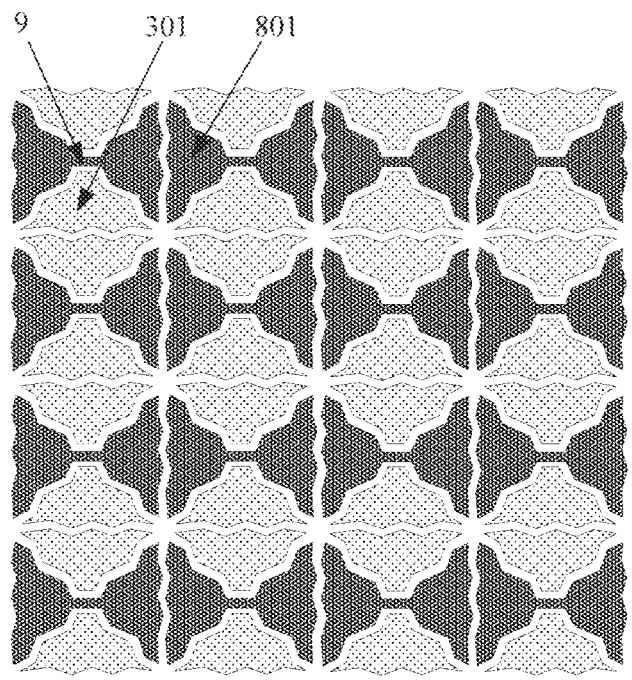
FIGS. 12A to 12C are diagrams illustrating intermediate structures in manufacturing the touch substrate in FIG. 3.
Figure 12B:
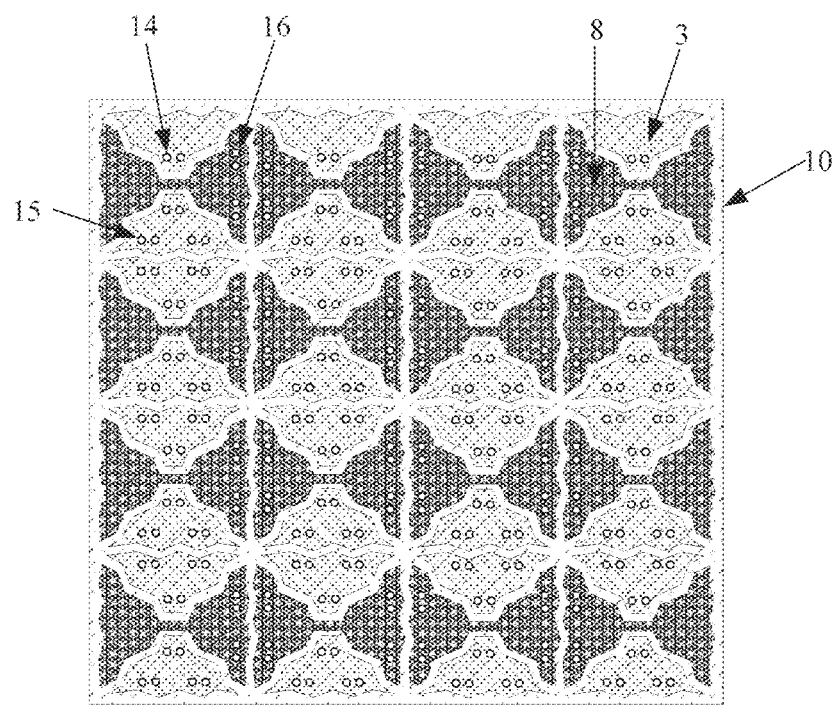
Figure 12C:
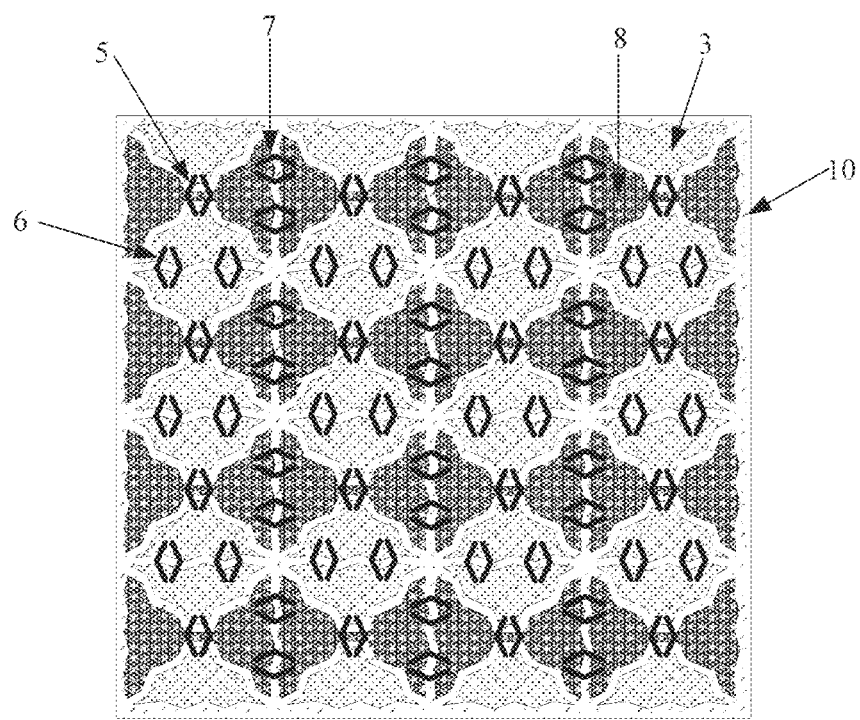

FIG. 11 is a flowchart illustrating a method of manufacturing a touch substrate in an embodiment according to the present disclosure; and FIGS. 12A to 12C are diagrams illustrating intermediate structures in manufacturing the touch substrate in FIG. 3. As illustrated in FIG. 11 to FIG. 12C, the touch substrate includes a plurality of first touch electrodes extending along a first direction and a plurality of second touch electrodes extending along a second direction, and each of at least part of the plurality of first touch electrodes includes a plurality of first electrodes disposed along the first direction and a first connection line (a first connection part) connecting adjacent first electrodes, each of at least part of the plurality of first electrodes includes two first sub-electrodes disposed along the first direction and a plurality of second connection lines (a second connection part) connecting the two first sub-electrodes; each of at least part of the plurality of second touch electrodes includes a plurality of second electrodes disposed along the second direction and a third connection part connecting adjacent second electrodes, and each of at least part of the plurality of second electrodes includes two second sub-electrodes disposed along the second direction and a plurality of third connection lines (a fourth connection part) connecting the two second sub-electrodes.

In some embodiments, the method of manufacturing the touch substrate includes step S201 to step S203.

At step S201, a pattern of the first sub-electrode, a pattern of the second sub-electrode, and a pattern of the third connection part are formed through a single patterning process.

Referring to FIG. 12A, at step S201, a layer of a first conductive film is first formed on a base substrate by a film forming process (e.g., vapor deposition, magnetron sputtering, etc.). In an embodiment, the conductive film is made of a transparent conductive material such as ITO. Then, at step S201, a patterning process is performed on the first conductive film to obtain the pattern of the first sub-electrode 301, the pattern of the second sub-electrode 801, and the pattern of the third connection part 9, the third connection part 9 is formed to connect two second sub-electrodes 801 from adjacent second electrodes 8. In some embodiments, the first sub-electrode 301 and the second sub-electrode 801 may each have a curved edge to improve blanking effect of the first sub-electrode 301 and the second sub-electrode 801.

It should be noted that the patterning process in the present disclosure refers to a process for patterning a film, including processes such as photoresist coating, exposing, developing, etching, and photoresist removing. The patterning process may also include other processes for forming a predetermined pattern, such as printing and inkjet.

At step S202, a pattern of an insulation layer is formed through a patterning process.

Referring to FIG. 12B, a first via 14 is formed in a region of the insulation layer 10 corresponding to a region for connecting the first connection line 5 and adjacent first electrodes 3, a second via 15 is formed in a region of the insulation layer 10 corresponding to a region for connecting the second connection line 6 and two first sub-electrodes 301 belonging to a same first electrode 3, and a third via 16 is formed in a region of the insulation layer 10 corresponding to a region for connecting the third connection line 7 and two second sub-electrodes 801 belonging to a same second electrode 8.

In some embodiments, the insulation layer 10 may be made of a transparent organic material, e.g., over coat (OC), polyimide (PI). In some embodiments, the insulation layer 10 may be made of a transparent inorganic material, e.g., silicon oxide, silicon nitride.

It should be noted that when the insulation layer 10 is made of an organic material having a function of a photoresist, the film for the insulation layer 10 may be patterned by performing exposing and developing only.

At step S203, the first connection line, the second connection line and the third connection line are formed through a single patterning process.

Referring to FIG. 12C, at step S203, a layer of a second conductive film is formed on the base substrate by a film forming process; the second conductive film is then patterned to obtain the first connection line 5, the second connection line 6 and the third connection line 7. The first connection line 5 is connected to a respective first electrode 3 through the first via 14, the second connection line 6 is connected to a respective first sub-electrode 301 through the second via 15, and the third connection line 7 is connected to a respective second sub-electrode 801 through the third via 16.

In some embodiments, the second conductive film and the first conductive film are made of a same material. Therefore, the lapping effect between each of the connection lines and a respective electrode can be improved. Of course, the second conductive film may be made of another material, such as a metal material having a good scalability, e.g., copper, which belongs to the protection scope of the present disclosure.

Moreover, in the present disclosure, parts of the insulation layer 10 in regions where the second connection line 6 and the third connection line 7 are to be formed may be removed completely, and the second connection line 6 and the third connection line 7 formed in step S203 are directly connected to respective sub-electrodes, thereby effectively increasing contact areas between the second connection line 6 and the third connection line 7 and the respective sub-electrodes and improving connecting effect, which also belongs to the protection scope of the present disclosure.

It is to be understood that the above embodiments are merely exemplary embodiments for the purpose to explain the principles of the present disclosure, but the present disclosure is not limited thereto. Various modifications and improvements can be made by those skilled in the art without departing from the spirit and scope of the present disclosure. These modifications and improvements are also considered to be within the protection scope of the present disclosure.

What is claimed is:

1. A touch substrate, comprising a plurality of first touch electrodes and a plurality of second touch electrodes intersecting with each other; wherein
each of at least part of the plurality of first touch electrodes comprises a plurality of first electrodes disposed along a first direction and a first connection part connecting adjacent first electrodes, the first connection part comprises a pair of first connection lines extending along the first direction and configured to connect two first electrodes adjacent in the first direction, and the pair of first connection lines comprises two first connection lines symmetrical to each other and each of the two first connection lines has a curved line shape,
wherein each of the at least part of the plurality of first electrodes comprises two first sub-electrodes disposed along the first direction and a second connection part connecting the two first sub-electrodes, and the two first sub-electrodes are spaced apart from each other by a first gap extending along a second direction and between the two first sub-electrodes,
wherein an orthographic projection of each of the two first sub-electrodes on a plane parallel to the touch substrate comprises three edges connecting with each other and extending in different directions, each of the three edges is a curved edge, an orthographic projection of the first gap on the plane is defined by two edges, one of which is from the three edges of one of the two first sub-electrodes and other one of which is from the three edges of other one of the two first sub-electrodes;
the second connection part comprises two pairs of second connection lines symmetrical to each other, and each pair of second connection lines comprises two second connection lines symmetrical to each other;
each of the two second connection lines has the same curved line shape as each of the two first connection lines; and
a total number of second connection lines of the touch substrate is greater than a total number of first connection lines of the touch substrate.

2. The touch substrate of claim 1, wherein the two pairs of second connection lines and the pair of first connection lines are disposed in a same layer.

3. The touch substrate of claim 1, wherein each of at least part of the plurality of second touch electrodes comprises a plurality of second electrodes disposed along a second direction and a third connection part connecting adjacent second electrodes, the third connection part is insulated from the first connection part and an orthographic projection of the third connection part on the plane parallel to the touch substrate partially overlaps an orthographic projection of the first connection part on the plane.

4. The touch substrate of claim 3, wherein each of at least part of the plurality of second electrodes comprises two second sub-electrodes disposed along the second direction and a fourth connection part connecting the two second sub-electrodes, and the two second sub-electrodes are spaced apart from each other by a second gap extending along the first direction and between the two second sub-electrodes.

5. The touch substrate of claim 4, wherein the fourth connection part comprises at least one third connection line extending along the second direction and configured to connect the two second sub-electrodes belonging to a same second electrode, and the third connection line has a curved line shape.

6. The touch substrate of claim 5, wherein the at least one third connection line and the pair of first connection lines are disposed in a same layer.

7. The touch substrate of claim 4, wherein the second sub-electrode has a curved edge.

8. The touch substrate of claim 1, wherein the pair of first connection lines and the first electrode are made of a same material.

9. The touch substrate of claim 1, wherein an included angle between any two adjacent line segments of the first connection line having the curved line shape is larger than 90° and less than 180°.

10. A touch apparatus, comprising the touch substrate according to claim 1.

11. The touch apparatus of claim 10, wherein the two pairs of second connection lines and the pair of first connection lines are disposed in a same layer.

12. A method of manufacturing a touch substrate, comprising:
forming a first touch electrode on a base substrate, the first touch electrode being formed to comprise a plurality of first electrodes along a first direction and a first connection part connecting adjacent first electrodes, the first connection part being formed to comprise a pair of first connection lines extending along the first direction and configured to connect two first electrodes adjacent in the first direction, and the pair of first connection lines comprising two first connection lines symmetrical to each other and each of the two first connection lines having a curved line shape; and forming a second touch electrode on the base substrate, the second touch electrode being formed to intersect with the first touch electrode, wherein the first electrode is formed to comprise two first sub-electrodes disposed along the first direction and a second connection part connecting the two first sub-electrodes, and the two first sub-electrodes are formed to have a first gap extending along the second direction therebetween;

wherein each of the two first sub-electrodes is formed to have an orthographic projection on the base substrate comprising three edges connecting with each other and extending in different directions, each of the three edges is a curved edge, an orthographic projection of the first gap on the base substrate is defined by two edges, one of which is from the three edges of one of the two first sub-electrodes and other one of which is from the three edges of other one of the two first sub-electrodes, the second connection part is formed to comprise two pairs of second connection lines symmetrical to each other, and each pair of second connection lines comprises two second connection lines symmetrical to each other;

each of the two second connection lines has the same curved line shape as each of the two first connection lines; and a total number of second connection lines of the touch substrate is greater than a total number of first connection lines of the touch substrate.

13. The method of claim 12, wherein the second touch electrode is formed to comprise a plurality of second electrodes disposed along a second direction and a third connection part connecting adjacent second electrodes, the third connection part being insulated from the first connection part and an orthographic projection of the third connection part on the base substrate partially overlapping an orthographic projection of the first connection part on the base substrate;

the first touch electrode and the second touch electrode are formed simultaneously, and forming the first touch electrode and the second touch electrode comprises:

forming a pattern of the first electrode, a pattern of the second electrode and a pattern of the third connection part on the base substrate;

forming a pattern of an insulation layer on a side of the pattern of the third connection part away from the base substrate; and forming a pattern of the pair of first connection lines on a side of the insulation layer away from the base substrate.

14. The method of claim 13, wherein the second electrode is formed to comprise two second sub-electrodes disposed along the second direction and a fourth connection part connecting the two second sub-electrodes, and the two second sub-electrodes are formed to have a second gap extending along the first direction therebetween; and forming the pattern of the first electrode, the pattern of the second electrode and the pattern of the third connection part on the base substrate comprises:

forming a pattern of the first sub-electrode, a pattern of the second sub-electrode and the pattern of the third connection part by a single patterning process; and forming a pattern of the second connection part and a pattern of the fourth connection part by a single patterning process, wherein the single patterning process for forming the pattern of the second connection part and the pattern of the fourth connection part and a patterning process for forming the pattern of the pair of first connection lines are a same patterning process.

* * * * *